(12) United States Patent
Huang

(10) Patent No.: US 8,494,555 B2
(45) Date of Patent: Jul. 23, 2013

(54) MOBILE COMMUNICATION CIRCUIT REPORTING LOCATION INFORMATION AND METHODS THEREOF

(75) Inventor: Yu-Cheng Huang, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 62 days.

(21) Appl. No.: 13/311,374

(22) Filed: Dec. 5, 2011

(65) Prior Publication Data

US 2013/0143589 A1 Jun. 6, 2013

(51) Int. Cl.
*H04W 24/00* (2009.01)

(52) U.S. Cl.
USPC ..... 455/456.1; 455/440; 455/441; 455/404.1; 455/404.2

(58) Field of Classification Search
USPC .......... 455/456.1–459, 440, 441, 412.2, 455/404.1, 404.2
See application file for complete search history.

(56) References Cited

U.S. PATENT DOCUMENTS

| 2005/0037729 A1* | 2/2005 | Dupont et al. | 455/404.2 |
| 2008/0071761 A1* | 3/2008 | Singh et al. | 707/5 |
| 2009/0163243 A1* | 6/2009 | Barbera | 455/557 |

* cited by examiner

*Primary Examiner* — Chuong A Ngo
(74) *Attorney, Agent, or Firm* — McClure, Qualey & Rodack, LLP

(57) ABSTRACT

Mobile communication circuit reporting location information and methods thereof are provided. The circuit comprises a receiver, a transmitter, and a control circuit. The receiver receives first and second location information requests comprising respective first and second timing periods at first and second reference times respectively. The transmitter transmits first location information at a first reporting time having a first timing lapse from the first reference time in response to the first location information request and the second location information at a second reporting time in response to the second location information request. The control circuit, coupled to the receiver and the transmitter, calculates a timing difference between the first reporting time and the second reporting time, and determines second location information according to the first location information when the timing difference is less than or equal to a predetermined timing difference threshold.

20 Claims, 7 Drawing Sheets

MOBILE COMMUNICATION CIRCUIT REPORTING LOCATION INFORMATION AND METHODS THEREOF

BACKGROUND OF THE INVENTION

1. Field of the Invention

The present invention relates to location service (LCS), and in particular relates to mobile communication circuits and methods thereof for reporting location information.

2. Description of the Related Art

In a mobile communications network system, a number of mobile stations move within a coverage area or between coverage areas. The communications network can locate mobile stations within the network coverage area to provide location services (LCS), accordingly. The mobile stations can report its geographical position obtained by, for example, GPS positioning, periodically, to the communications network. A well known mobile communications network system is a public land mobile network (PLMN), wherein a cellular communication network is an example.

One exemplary application of LCS is personal tracking, wherein when the personal tracking function is activated by a subscriber, the network collects location information of a mobile station periodically and reports collected location information to the subscriber. In this way, the subscriber can keep track of the location of mobile stations. Since the mobile station actively reports its current location to the network, the computation load for obtaining the current location increases with the number of concurrently activated LCS applications. Thus, circuits and methods thereof, reporting location information for multiple LCS applications or operators, are required to reduce the computation load and power usage thereof.

BRIEF SUMMARY OF THE INVENTION

A detailed description is given in the following embodiments with reference to the accompanying drawings.

An embodiment of a method for reporting location information by a mobile communication circuit is described, including, receiving a first location information request at a first reference time; transmitting first location information at a first reporting time having a first timing lapse from the first reference time in response to the first location information request; receiving a second location information request at a second reference time; calculating a timing difference between the first reporting time and a second reporting time, wherein the second reporting time has a second timing lapse from the second reference time; determining second location information according to the first location information when the timing difference is less than or equal to a predetermined timing difference threshold; and transmitting the second location information at the second reporting time in response to the second location information request, wherein the first timing lapse is a first multiple of a first timing period; and the second timing lapse is a second multiple of a second timing period.

Another embodiment of a method for reporting location information by a mobile communication circuit is disclosed, including, receiving a first location information request at a first reference time, wherein the first location information request comprises a first timing period; transmitting first location information at a first reporting time having a first timing lapse from the first reference time in response to the first location information request; receiving a second location information request at a second reference time, wherein the second location information request comprises a second timing period; taking the first reporting time exceeding an initial second reporting time as a second reporting time, wherein the initial second reporting time having a second timing lapse from the second reference time, the second timing lapse is a second multiple of the second timing period; and transmitting the first location information at the second reporting time in response to the second location information request, wherein the first timing lapse is a first multiple of the first timing period.

Still another embodiment of a mobile communication circuit reporting location information thereof is revealed, including a receiver, a transmitter, and a control circuit. The receiver is capable of receiving a first location information request comprising a first timing period at a first reference time, and receiving a second location information request comprising a second timing period at a second reference time. The transmitter is capable of transmitting first location information at a first reporting time having a first timing lapse from the first reference time in response to the first location information request, and transmitting second location information at a second reporting time in response to the second location information request. The control circuit, coupled to the receiver and the transmitter, is capable of calculating a timing difference between the first reporting time and the second reporting time, and determining second location information according to the first location information when the timing difference is less than or equal to a predetermined timing difference threshold. The first timing lapse is a first multiple of the first timing period. The second reporting time has a second timing lapse from the second reference time. The second timing lapse is a second multiple of the second timing period.

Yet another embodiment of a mobile communication circuit reporting location information thereof is provided, including a receiver, a transmitter, and a control circuit. The receiver is capable of receiving a first location information request comprising a first timing period and a first reporting number of times at a first reference time, and receiving a second location information request comprising a second timing period and a second reporting number of times at a second reference time. The transmitter is capable of transmitting first location information at a first reporting time having a first timing lapse from the first reference time in response to the first location information request, and transmitting the first location information at a second reporting time in response to the second location information request. The control circuit, coupled to the receiver and the transmitter, is capable of taking the first reporting time exceeding an initial second reporting time as the second reporting time. The first timing lapse is a first multiple of the first timing period, and the initial second reporting time having a second timing lapse from the second reference time, the second timing lapse is a second multiple of the second timing period.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
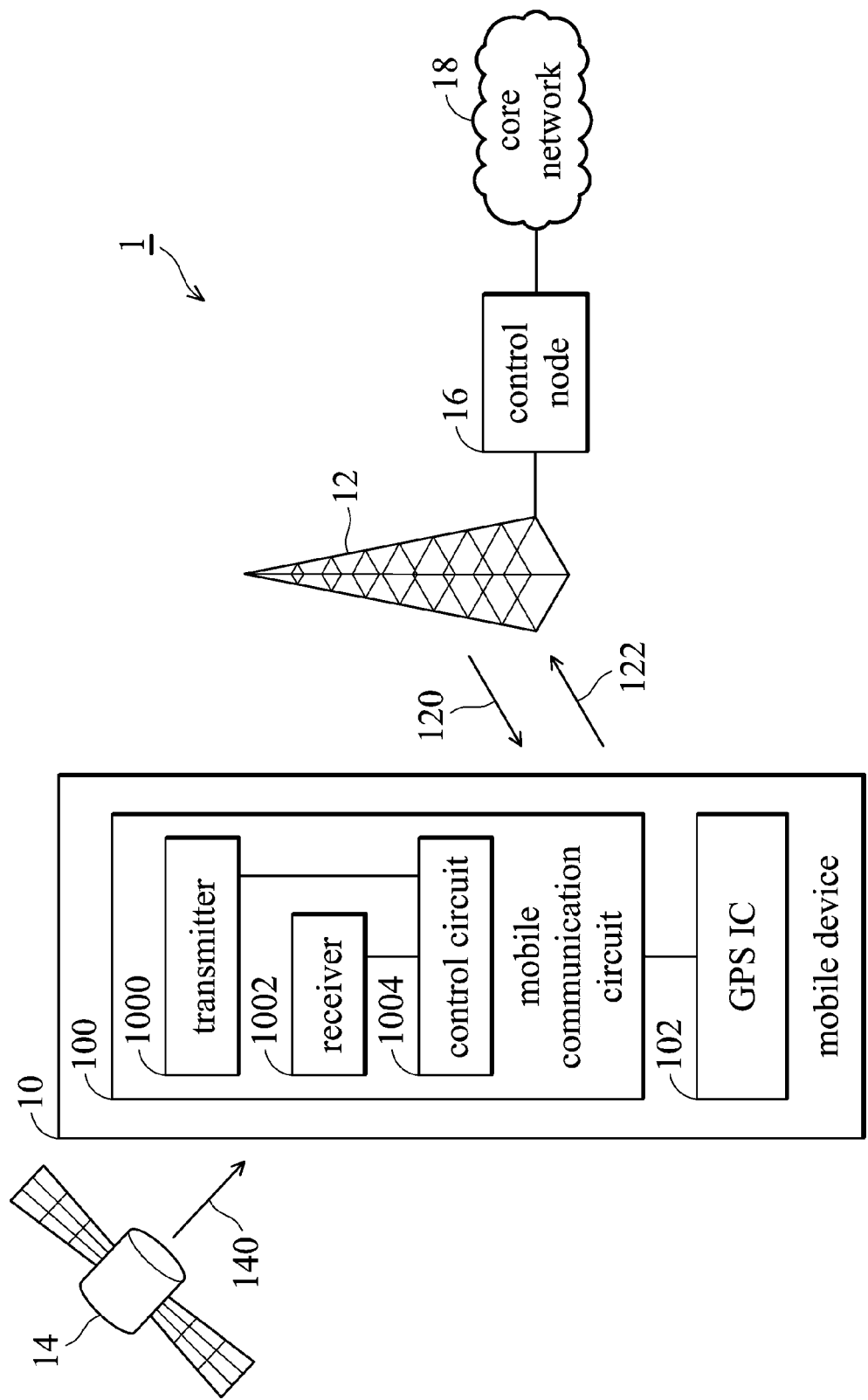
FIG. 1 depicts a system diagram of an exemplary telecommunication system 1 capable of providing a location service in accordance with the present invention.

FIG. 1 depicts a system diagram of an exemplary telecommunication system 1 capable of providing a location service in accordance with the present invention. The telecommunication system 1 includes a mobile device 10, a base station 12, a GPS satellite 14, a control node 16, and a core network CN 18. The mobile device 10 is wirelessly coupled to the GPS satellite 14 and the base station 12, which is coupled to the control node 16, and then to the CN 18 through wired, wireless, or combinational connection.

The base station 12 is capable of providing a cell coverage area for providing telecommunication services for mobile device(s) therein. Although only one base station 12 is shown in the telecommunication system 1, it should be appreciated that more than one base station may be incorporated to provide the cell coverage area, and the base station 12 can serve more than one cell coverage area. The telecommunication service may include second, third, fourth generation telecommunication systems or the like, such as Global System for Mobile communications (GSM) system, Universal Mobile Telecommunications System (UMTS), Long Term Evolution (LTE) system, etc. The control node 16 may be a base station controller (BSC) in a GSM system, a radio network controller (RNC) in a UMTS radio access network (UTRAN) or the like. The control node 16 is capable of controlling operations of the base station 12 and providing access to the core network 18. The core network 18 is capable of providing various services to mobile stations subscribed thereto through the access network including the base station 12 and the control node 16. For example, the control network 18 can provide location service (LCS) such as tracking location information of a target mobile station such as the mobile device 10. As a user carrying the mobile device 10 moves within the coverage area of the base station 12 or from one coverage area to another, the location of the mobile device 10 may vary over time, and the mobile device 10 can report the location information thereof to the core network 18 through the access network. The mobile device 10 can report the location information thereof periodically. The location information of the mobile device 10 may be defined, for example, in X and Y coordinates, in latitude and longitude, in spherical coordinates, or in any other coordination system. The coordinates may be defined as an absolute position on earth, in relation to a location of the base station 12, or any other suitable ways.

The mobile device 10 may be a cellular phone, a notebook computer with a broadband network adaptor, or any mobile terminal that includes wireless communication capability.

The mobile device 10 can include a mobile communication circuit 100 and a GPS IC 102 coupled thereto. Although the mobile communication circuit 100 and the GPS IC 102 are shown as separate ICs in FIG. 1, it should be appreciated that the two may be integrated as a single IC or divided into more integrated or discrete circuits. The mobile communication circuit 100 can include a transmitter 1000 and a receiver 1002 to communicate with the base station 12 through an uplink channel 122 and a downlink channel 120. The mobile communication circuit 100 can also include a control circuit 1004 coupled to the transmitter 1000 and the receiver 1002. The control circuit 1004 is capable of controlling the transmitter 1000 and the receiver 1002 to perform mobile communications with the base station 12, including receiving and responding to location information requests from the base station 12. The GPS IC 102 is capable of receiving a GPS signal 140 from the GPS satellite 14 and calculating the location information based on the GPS signal 140 when the mobile communication circuit 100 requests for a location information report.

Although only one GPS satellite 14 is shown on FIG. 1, other GPS satellites (not shown) may also be present to provide additional GPS signals (not shown) for positioning the location of the mobile device 10. In cases of assisted GPS (AGPS), the receiver 1002 is capable of receiving GPS satellite information from an AGPS network (not shown) through a base station (not shown) to assist the GPS IC 102 to acquire the GPS signals from the GPS satellite 14 and calculate the location information based thereon. In other cases of AGPS, the receiver 1002 is capable of receiving AGPS signals from the AGPS network, and then the GPS IC 102 is capable of computing the location information of the mobile device 10 thereby. In some implementations, the mobile device 10 queries and receives the location information thereof from the GPS IC 102. In other implementations, the mobile device 10 queries and receives the location information from the core network 18 through the base station 12. Upon receiving a query for the current location of the mobile device 10, the base station 12 sends a location query with cell identification identifying the base station 12 such as location area code or routing area code to the core network 14. In response, the core network 14 returns the requested location information corresponding to the cell identification to the mobile device 10. In other implementations, the mobile device 10 queries and receives the location information thereof via Bluetooth, Wi-Fi, or other near field communication technologies. For examples, the mobile device 10 can establish a Bluetooth connection with a vehicle having a positioning device thereon, so that the mobile device 10 can query and acquire the location information thereof through the positioning device. The vehicle may include a bicycle, car, motorcycle, train, ship, boat, or other transportation means. In still other implementations, the mobile device 10 can establish a Bluetooth connection with a computer network having positioning capability, so that the mobile device 10 can determine the location information thereof through the positioning computer network. In all location or positioning applications, the mobile device 10 can consume limited battery power in order to make queries and receive for the location information.

Figure 2:
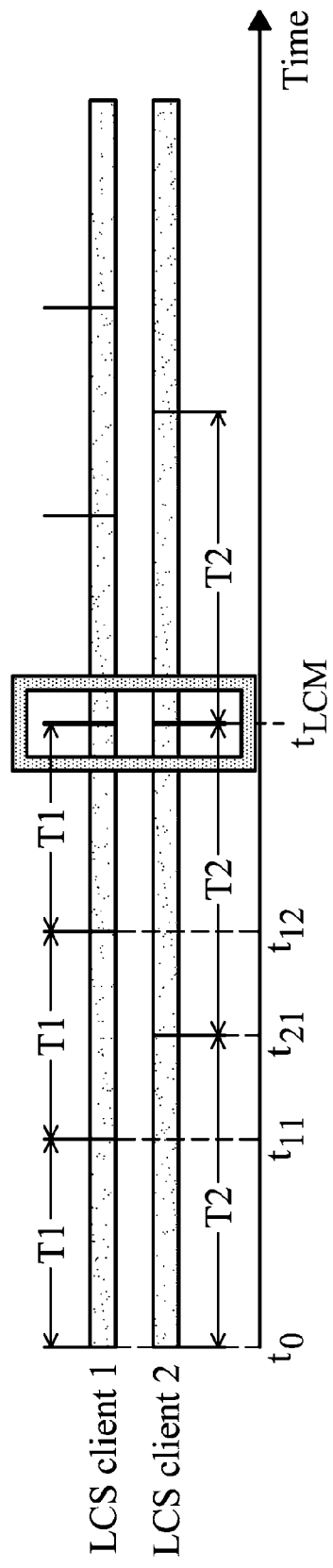
FIG. 2 illustrates a timing diagram of location information report transmissions employing a location information reporting method according to the invention.

One or more LCS clients may request location information reports from one mobile device at different points of time and at different reporting rates. The LCS client is whoever that requests for and receives location information of a LCS capable device such as the mobile device 10. The LCS client may be a person, an organization, an apparatus, even software. For examples, the LCS client may be a mother who wishes to know the location of her child, a school that wishes to know the location of a student, a taxi rental or vehicle rental company that wishes to know the location of a taxi or a rental car, or a telecommunication service company offering a taxi tracking service that tracks the location of a taxi. It should be appreciated that one or more core networks, control nodes, base stations, other mobile devices and any combination thereof may make a request to the mobile device 10 for one or more LCS clients. In one example, the core network 18 requests location information from the mobile device 10 for first and second LCS clients, and for each location information request, the mobile device 10 can be requested to report location information at a specific reporting rate and for a specific reporting number of times. FIG. 2 illustrates a timing diagram of location information report transmissions employing a location information reporting method according to the invention. The receiver 1002 of the mobile device 10 is capable of receiving the first and second location information requests from the first and second LCS clients substantially concurrently at time $t_0$ or an earlier moment and reporting the location information corresponding thereto. Each location information request may include client identification (ID) information such as a subscriber identity module (SIM) card number, application identification, or any other information identifying the LCS clients. The client ID information of the LCS client may be assigned by a network operator such as AT&T that provides the telecommunication service or the location service. The client ID information may be public or private information. In some implementations, the client ID information is private and only accessible by the network operator. Each location information request includes information on a reporting timing period and a reporting number of times so that the recipient can respond with a location information report at every timing period for the reporting number of times, accordingly. For example, the first location information request may include the first report timing period of 2 s and 300 times of first location information reports, the second location information request may include the second report timing period of 3 s and 200 times of second location information reports. The mobile device 10 is capable of responding to the first location information request with a first location information report informing the location information thereof to the LCS client 1 at every timing period T1, i.e., a location information report can be delivered at time $t_{11}$, $t_{12}$, $t_{LCM}$, and so on. Similarly, the mobile device 10 is capable of responding to the second location information request from the LCS client 2 with a second location information report at every timing period T2, i.e., at time $t_{21}$, $t_{LCM}$, and so on. The transmitter 1000 is capable of sending both the first and second location information reports at time $t_{LCM}$. Traditionally, the mobile device 10 retrieves and computes the GPS signals from the GPS satellite 14 or the AGPS network whenever a location information report is requested. Since two location information reports are required at time $t_{LCM}$, i.e., one for the first location information request from LCS client 1 and one for the second location information request from LCS client 2, the control circuit 1004 traditionally queries the GPS IC 102 twice to derive the first and second location information reports. In the present embodiment, when two location information reports are required at substantially the same time such as $t_{LCM}$, the mobile communication circuit 100 can only make a request to the GPS IC 102 once, for a common location information report. The time $t_{LCM}$ can be determined by the least common multiple of the first timing period T1 and the second timing period T2. For example, the time $t_{LCM}$ happens every 6 s when the first timing period T1 is 2 s and the second timing period T2 is 3 s. The transmitter 1000 can subsequently transfer the common location information report twice at substantially the same time $t_{LCM}$ in response to the first and second location information requests, thereby reducing power consumption and hardware resources in comparison with the traditional approaches.

Figure 3:
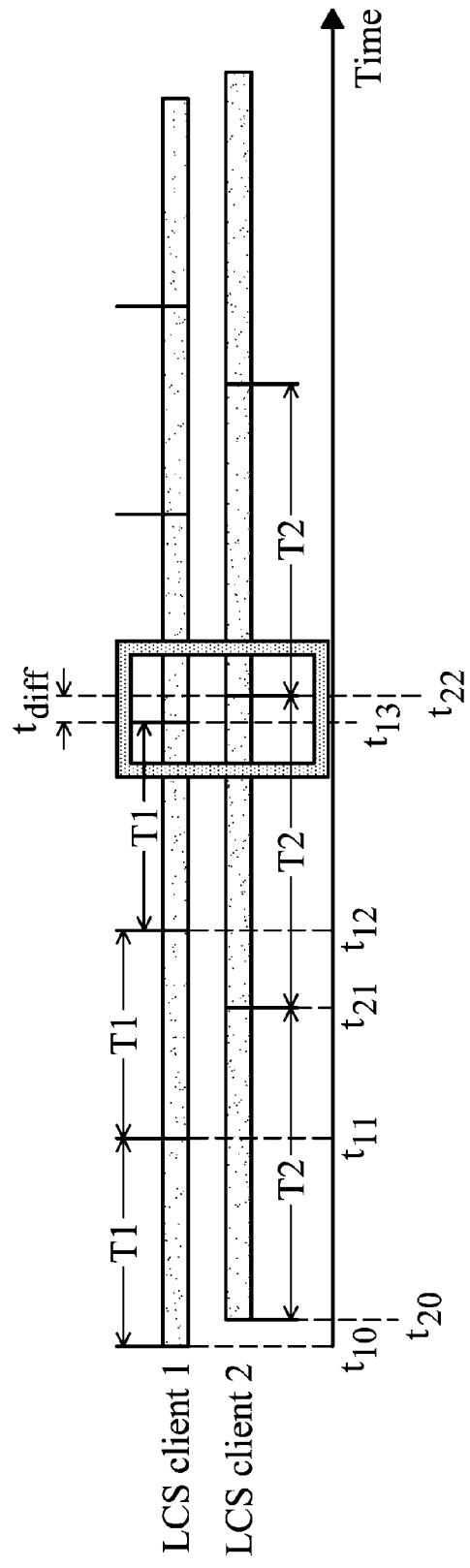
FIG. 3 illustrates a timing diagram of location information report transmissions employing another location information reporting method according to the invention.

FIG. 3 illustrates a timing diagram of location information report transmissions employing another location information reporting method according to the invention. The receiver 1002 of the mobile device 10 is capable of receiving the first location information request from LCS client 1 and the second location information request from LCS client 2 substantially identical to those in the example of FIG. 2, except that the two location information requests are received at time $t_{10}$ or an earlier moment and $t_{20}$ or an earlier moment respectively, resulting in delivering of the location information reports in response to the first location information request at time $t_{11}$, $t_{12}$, $t_{13}$ and so on, and in response to the second location information request at time $t_{21}$, $t_{22}$ and so on. Since the timing difference $t_{diff}$ between time $t_{13}$ and time $t_{22}$ is small, location of the mobile device 10 can be the same or of little change. Thus, the transmitter 1000 can transmit the same location information report at time $t_{13}$ and time $t_{22}$. More specifically, so long as the timing difference $t_{diff}$ between the two location information reporting times are less than or equal to a predetermined timing difference threshold $t_{Pdiff}$, the mobile device 10 may be considered as not having been moved or not moved much, thus can produce less, such as only one, location information report. Therefore, computation load and/or power usage can be reduced. The predetermined timing difference threshold $t_{Pdiff}$ may be the smallest one of the reporting timing periods of the location information requests, such as min{T1, T2}, or any other value satisfying the location information requests while helping save power. The predetermined timing difference threshold $t_{Pdiff}$ can be determined according to the location information requests and/or design requirements, and may be defined by a manufacturer of the mobile device 10 or an LCS service provider, and may be configurable by software, hardware or both. In another example, instead of querying GPS IC 102 again, the control circuit 1004 is capable of utilizing first location information in the first location information report transmitted at time $t_{13}$ and the timing difference $t_{diff}$ to compute predicted location information for a second location information report to be transmitted at time $t_{22}$. The predicted location information may be computed by interpolation, extrapolation, other location prediction mechanisms, or a combination thereof. Since the GPS IC 102 is less queried and/or less location information reports are produced, thereby reducing computation load and/or power usage of the mobile device 10.

Figure 4:
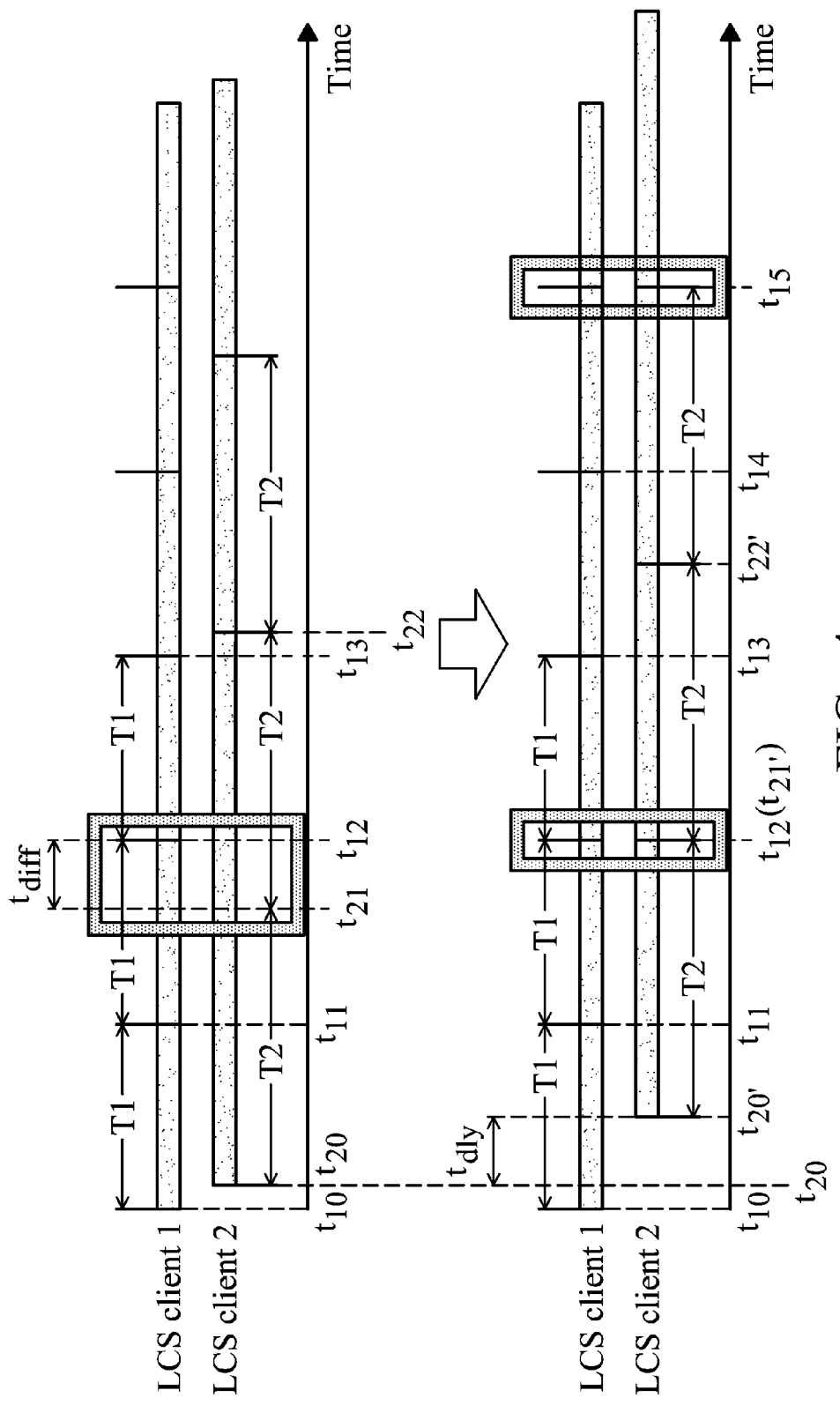
FIG. 4 illustrates a timing diagram of location information report transmissions employing yet another location information reporting method according to the invention.

FIG. 4 illustrates a timing diagram of location information report transmissions employing yet another location information reporting method according to the invention. Similar to the location information report transmission in the FIG. 3, the receiver 1002 of the mobile device 10 is capable of receiving the first location information request from LCS client 1 and the second location information request from LCS client 2 at the first reference time $t_{10}$ or an earlier moment and second reference time $t_{20}$ or an earlier moment respectively. In response, the mobile device 10 can have the first location information reports ready to be sent at time $t_{11}$, $t_{12}$, $t_{13}$ and so on, and the second location information reports ready at time $t_{21}$, $t_{22}$ and so on. According to the second location information request, the initial second reporting time would be time $t_{21}$ and the first reporting time immediately exceeding thereto occurs at time $t_{12}$. Since there is a timing difference $t_{diff}$ between the initial second reporting time $t_{21}$ and the first reporting time $t_{12}$, the control circuit 1004 is capable of delaying the initial second reporting time $t_{21}$ by a delay time such that a delayed timing difference between the delayed second reporting time $t_{21}$, and the first reporting time $t_{12}$ is less than or equal to a predetermined timing difference threshold $t_{Pdiff}$; or such that there is substantially no delayed timing difference. In some embodiments, the initial second reporting time $t_{21}$ can be delayed and/or aligned with the first reporting time $t_{12}$, irrespective of the value of the timing difference $t_{diff}$. When the timing difference $t_{diff}$ is small (such as less than or equal to the predetermined timing difference threshold $t_{Pdiff}$), the initial second reporting time $t_{21}$ can be delayed to provide an increased precision on the second location information reporting. The delay time would be no larger than the smallest one among all timing periods, such as the first and second timing periods T1 and T2. As a consequence, the second location information reporting times can be changed to delayed time $t_{21}'$, $t_{22}'$ and so on. Since the first reporting time $t_{12}$ and delayed second reporting time $t_{21}'$ are aligned together or the timing difference between the delayed second reporting time $t_{22}$, and the first reporting time $t_{12}$ is less than or equal to a predetermined timing difference threshold $t_{Pdiff}$, it may not be necessary to produce two separate location information reports for the first and second location information requests, and the mobile device 10 can transmit two copies of the same location information report in response to the first and second location information requests at time $t_{12}(t_{21}')$. Since less location information reports are produced, computation load and/or power usage of the mobile device 10 therefore reduces.

Figure 5:
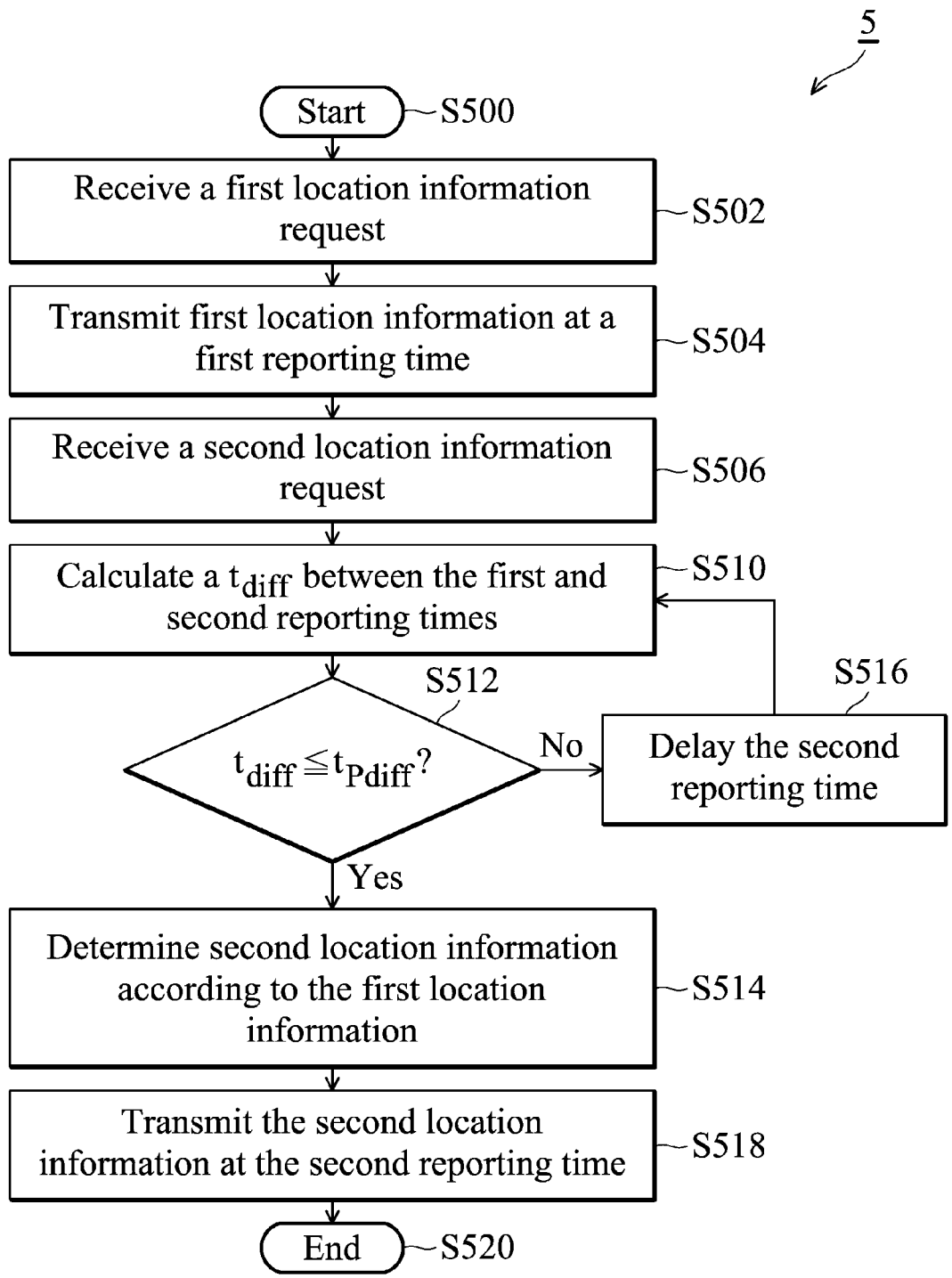
FIG. 5 is a flowchart of an exemplary location information reporting method according to the invention.

FIG. 5 is a flowchart of an exemplary location information reporting method according to the invention. This method can be performed by the mobile communication circuit 100 in FIG. 1.

The location information reporting method 5 starts from Step S500. In Step S502, a first location information request can be received at a first reference time $t_{10}$ by, for example, the receiver 1002. The first location information request can include a first timing period T1 and a first reporting number of times that the location information report is required to be provided for. The first location information request may be issued by an LCS provider at the core network 18 based on client identification (ID) information such as a subscriber identity module (SIM) card number, application identification, or any other information identifying the LCS clients. For example, a first LCS subscriber may inform the core network 18 of an interest to receive a location information of the mobile device 10, and the core network 18 can issue a first location information request with a specific SIM card number of the mobile device 10 or a specific application identification to identify the LCS application requested by the first LCS subscriber.

Upon the first location information request, the control circuit 1004 is capable of querying the GPS IC 102 for a first location information, and the first location information in a first location information report can be transmitted at a first reporting time by, for example, the transmitter 1000 in response to the first location information request in Step S504 to the base station 12. The first reporting time can have a first timing lapse from the first reference time. The GPS IC 102 is capable of computing the first location information using the GPS signal 140 from the GPS satellite 14, or the AGPS signal (not shown) from the AGPS network (not shown) in conjunction with the GPS signal 140 from the GPS satellite 14. In the case of AGPS, the GPS IC 102 employs the AGPS signal to assist and speed up computation for the location information on the basis of the location information in the GPS signal 140. Since the first reporting time can be periodic, the first reporting time can be obtained by, for example, the control circuit 1004 by accumulating the first timing period T1 with the first reference time to derive an initial first reporting time $t_{11}$, and by accumulating another first timing period T1 with the first reporting time $t_{11}$ to derive a next first reporting time $t_{12}$, and so on. However, the first reporting time can be obtained by any other suitable methods; for example, the first reporting time can be provided by the LCS client, the LCS provider, the operator, etc.

In Step S506, a second location information request can be received at a second reference time $t_{20}$ by, for example, the receiver 1002. Likewise, the second location information request can include a second timing period T2 and a second reporting number of times that the location information report is required to be provided for. The second location information request may be issued by the same or different LCS provider of the first location information request. The second location information request is issued based on a client identification (ID) information that is different from the one in the first location information request. The client identification (ID) information can include a subscriber identity module (SIM) card number, application identification, or any other information identifying the LCS clients. In one embodiment, the control circuit 1004 can be utilized to determine the second reporting time according to the second location information request. Because the second reporting time can be periodic, the control circuit 1004 can compute the second reporting time by accumulating the second timing period T2 with the second reference time $t_{20}$ to derive an initial second reporting time $t_{21}$, and by accumulating another second timing period T2 with the second reporting time $t_{21}$ to derive a next second reporting time $t_{22}$, and so on. However, the second reporting time can be obtained by any suitable methods; for example, the second reporting time can be provided by the LCS client, the LCS provider, the operator, etc.

In Step S510, the timing difference $t_{diff}$ between the first and second reporting times can be calculated by, for example, the control circuit 1004. For example, the timing difference $t_{diff}$ can be computed for the initial second reporting time $t_{21}$ and the first reporting time immediately successive thereto, e.g., the second reporting time $t_{21}$ and the first reporting time $t_{12}$ in FIG. 4.

In Step S512, the control circuit 1004 can be utilized to determine whether the timing difference $t_{diff}$ is not larger than, i.e. less than or equal to, the predetermined timing difference threshold $t_{Pdiff}$. If so, the location information reporting method 5 can continue to Step S514, otherwise the location information reporting method 5 can go to Step S516.

In Step S514, the control circuit 1004 can be utilized to determine second location information according to the first location information. Assuming the mobile device 10 was at a first location at the first reporting time, when the timing difference $t_{diff}$ is less than or equal to the predetermined timing difference threshold $t_{Pdiff}$, the control circuit 1004 can determine that the mobile device 10 may have remained at a nearby or substantially the same geographical location as the first location. Instead of requesting for another location information from the GPS IC 120, the first location information can be reused as the second location information by, for example, the control circuit 1004. In some cases the control circuit 1004 can utilize the first location information and the timing difference $t_{diff}$ to determine predicted second location information. The predicted location information may be computed by interpolation, extrapolation, other location prediction mechanisms, or a combination thereof. Since less location information reports are produced, computation load and/or power usage of the mobile device 10 therefore reduces.

In Step S516, when the timing difference $t_{diff}$ exceeds the predetermined timing difference threshold $t_{Pdiff}$, the second reporting time can be delayed by a time amount by, for example, the control circuit 1004. The second reporting time can be delayed until a delayed timing difference $t_{diff}$ between the first reporting time and the delayed second reporting time is less than or equal to the predetermined timing difference threshold $t_{Pdiff}$. In one example, the control circuit 1004 can be utilized to delay the second reporting time until there is substantially no timing difference between the delayed second reporting time and the first reporting time, i.e., the delayed timing difference $t_{Pdiff}=0$. In another example, the control circuit 1004 can be utilized to delay the second reporting time such that the delayed timing difference $t_{diff}$ is equal to the predetermined timing difference threshold $t_{Pdiff}$. Thus, assuming the mobile device 10 was at a first location at the first reporting time, the mobile device 10 can be regarded as having remained at a nearby or a substantially same geographical location as the first location. Therefore, the same first location information report can be sent at the delayed second reporting time and the first reporting time. The delayed time amount may be fixed, or configurable by software, hardware, or a combination according to different requirements. Since less location information reports are produced, computation load and/or power usage of the mobile device 10 therefore reduces.

In Step S518, the second location information can be transmitted at the second reporting time/delayed second reporting time by, for example, the transmitter 1000.

The location information reporting method 5 ends at Step S520.

In some embodiments, the second reporting time can be delayed and/or aligned with the first reporting time, irrespective of the value of the timing difference $t_{diff}$. When the timing difference $t_{diff}$ is small (such as less than or equal to the predetermined timing difference threshold $t_{Pdiff}$), the second reporting time can be delayed to provide an increased precision on the second location information reporting.

Figure 6:
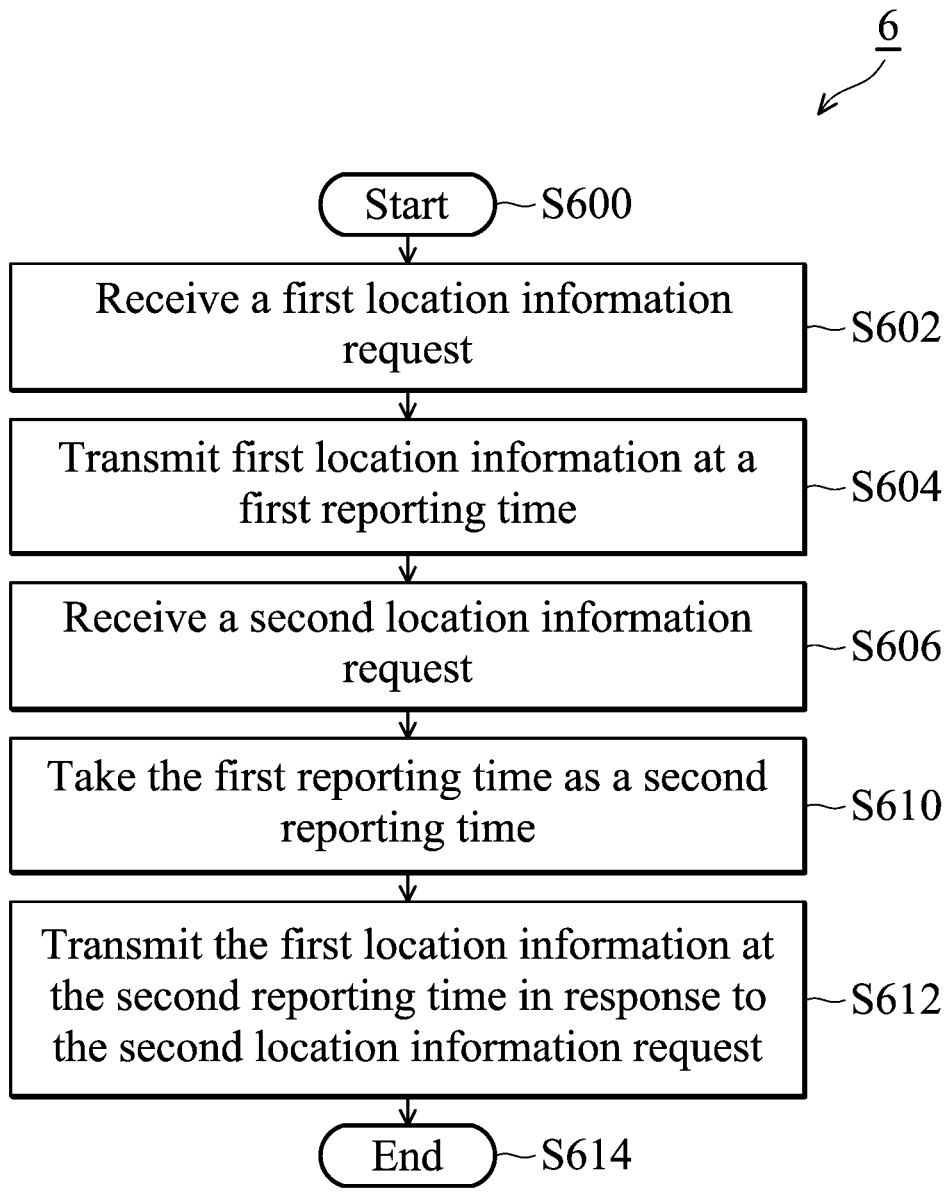
FIG. 6 is a flowchart of another exemplary location information reporting method according to the invention.

FIG. 6 is a flowchart of another exemplary location information reporting method according to the invention. This method can be performed by the mobile communication circuit 100 in FIG. 1.

The location information reporting method 6 starts from Step S600. In Step S602, a first location information request can be received at a first reference time $t_{10}$ by, for example, the receiver 1002. The first location information request can include a first timing period T1 and a first reporting number of times that the location information report is required to be provided for. The first location information request may be issued by the LCS provider at the core network 18 based on a client identification (ID) information. The client identification (ID) information can include a subscriber identity module (SIM) card number, application identification, or any other information identifying the LCS clients.

In Step S604, the control circuit 1004 is capable of querying the GPS IC 102 for a first location information the first location information in a first location information report can be transmitted at the first reporting time by, for example, the transmitter 1000 in response to the first location information request. The first reporting time can have a first timing lapse from the first reference time. The GPS IC 102 is capable of computing the first location information based on the GPS signal 140 from the GPS satellite 14, or the AGPS signal (not shown) from the AGPS network (not shown) in conjunction with the GPS signal 140 from the GPS satellite 14. In the case of AGPS, the GPS IC 102 employs the AGPS signal to assist and speed up computation for the location information on the basis of the location information in the GPS signal 140. Since the first reporting time can be periodic, the first reporting time can be obtained by, for example, the control circuit 1004 by accumulating the first timing period T1 with the first reference time to derive an initial first reporting time $t_{11}$, and by accumulating another first timing period T1 with the first reporting time $t_{11}$ to derive a next first reporting time $t_{12}$, and so on. However, the first reporting time can be obtained by any other suitable methods; for example, the first reporting time can be provided by the LCS client, the LCS provider, the operator, etc.

In Step S606, a second location information request can be received at a second reference time $t_{20}$ by, for example, the receiver 1002. The second location information request can include a second timing period T2 and a second reporting number of times that the second location information report is required to be provided for. The second location information request may be issued by the same or different LCS providers of the first location information request. The second location information request may include a client identification (ID) information. The client identification (ID) information can include a subscriber identity module (SIM) card number, application identification, or any other information identifying the LCS clients.

In one embodiment, the control circuit 1004 can be utilized to determine an initial second reporting time according to the second location information request. The initial second reporting time can be a second multiple of the second timing period T2 from the second reference time $t_{20}$. The second reporting time can be periodic, the control circuit 1004 can compute the second reporting time by accumulating the second timing period T2 with the second reference time to derive an initial second reporting time $t_{21}$, and accumulating another first timing period T2 with the second reporting time $t_{21}$ to derive a next first reporting time $t_{22}$, and so on. However, the second reporting time can be obtained by any suitable methods; for example, the second reporting time can be provided by the LCS client, the LCS provider, the operator, etc.

In Step S610, the control circuit 1004 can be utilized to take the first reporting time exceeding the initial second reporting time as a second reporting time. Taking FIG. 4 as an example, the initial second reporting time is time $t_{21}$, the first reporting time exceeding the initial second reporting time may be time $t_{12}$, $t_{13}$ and so on. In one embodiment, the first reporting time is chosen by the immediately succeeding time $t_{21}$, i.e., $t_{12}$. The timing difference between the initial second reporting time $t_{21}$ and the first reporting time $t_{12}$ is not larger than the shorter of the first timing period T1 and the second timing period T2.

In Step S612, the first location information can be transmitted at the second reporting time in response to the second location information request by, for example, the transmitter 1000. Since the first reporting time $t_{12}$ and second reporting time $t_{21}'$ are aligned together, the GPS IC 102 only has to compute one location information report, the transmitter 1000 can transmit two copies of the same location information report to the core network 18 at time $t_{12}(t_{21}')$. Since less location information reports are produced, computation load and/or power usage of the mobile device 10 therefore reduces.

The location information reporting method 6 ends at Step S614.

As to successive second reporting time $t_{22}'$ which is not aligned with first reporting times, new location information can be obtained and transmitter in response to the second location information request. The successive second reporting time $t_{22}'$ can be derived by adding a second multiple of the second timing period T2 to the second reporting time $t_{21}'$.

Figure 7:
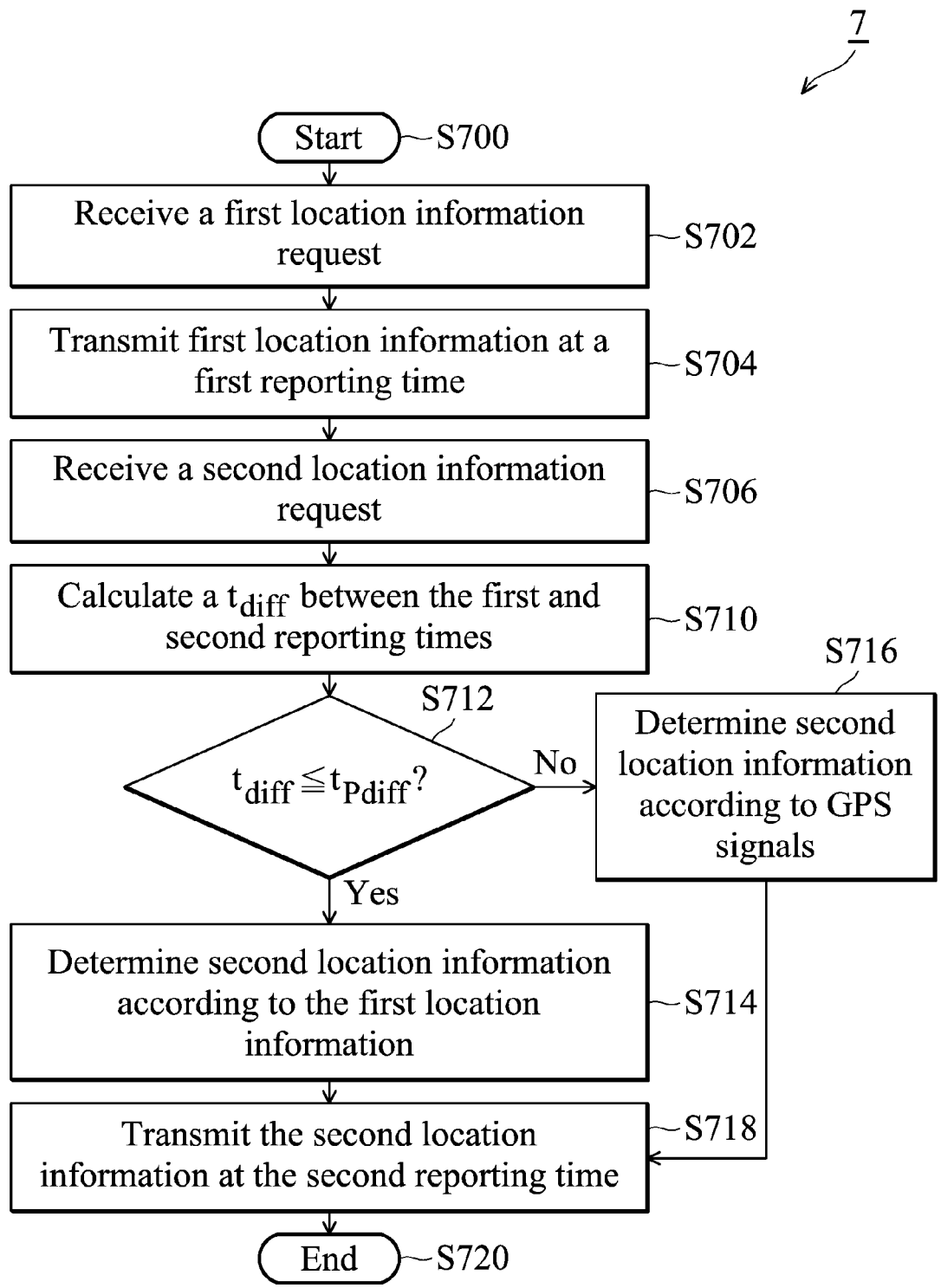
FIG. 7 is a flowchart of yet another exemplary location information reporting method according to the invention.

FIG. 7 is a flowchart of yet another exemplary location information reporting method 7. This method can be performed by the mobile communication circuit 100 in FIG. 1. The location information reporting method 7 can be used at any second reporting time, i.e., $t_{21}$, $t_{22}$, $t_{23}$, . . . , etc.

The location information reporting method 7 starts from Step S700.

Reference can be made to Step S502 to Step S514 in FIG. 5, for the description for Step S702 to Step S714. The Step S702 to Step S714 are similar to Step S502 to Step S514 except that Step S510 to Step S512 can be applied to only the initial second reporting time $t_{21}$, whereas Step S710 to Step S712 can be used for any second reporting time $t_{21}$, $t_{22}$, $t_{23}$, . . . , etc. For each second reporting time, the control circuit 1004 can be utilized to calculate the timing difference $t_{diff}$ between the second reporting time and the immediate preceding first reporting time, such as the second reporting time $t_{21}$ and the first reporting time $t_{11}$, and the second reporting time $t_{22}$ and the first reporting time $t_{13}$ in FIG. 3. Assuming the mobile device 10 was at a first location at the first reporting time, when the timing difference $t_{diff}$ is less than or equal to a predetermined timing difference threshold $t_{Pdiff}$, the mobile device 10 can be treated as if has remained at a nearby or a substantially the same geographical location as the first location and the transmitter 1000 can be utilized to transmit the same copy of the location information report to the core network 18 at the first and second reporting times.

The location information reporting methods 7 and 5 differ at Step S716 and Step S516. In Step S716, when the timing difference $t_{diff}$ exceeds the predetermined timing difference threshold $t_{Pdiff}$, the control circuit 1004 is capable of querying the GPS IC 102 to obtain second location information according to the GPS signal 140. Because the timing difference $t_{diff}$ between the first and second reporting times is larger than the predetermined timing difference threshold $t_{Pdiff}$, the locations of the mobile device 10 at the first and second reporting times may not be near each other or substantially the same, thus, separate location information may be needed to be computed or obtained.

In Step S718, the second location information report can be transmitted at the second reporting time by, for example, the transmitter 1000. Depending on the timing difference $t_{diff}$, the second location information report may include the second location information from Step S714 or S716.

The location information reporting method 7 ends at Step S720.

The location information reporting method 7 can transmit the same location information report at more than two reporting times in response to more than two location information requests when the reporting times are close to one another, reducing the computation for the second location report and the power usage of the mobile device 10.

Although various embodiments for the location information reporting methods are illustrated in FIG. 5 through FIG. 7, it should be appreciated that a combination thereof may be implemented. In addition, the steps in the embodiments may be selectively implemented or adapted in other operational order to accommodate requirement of the actual implementation.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of reporting location information by a mobile communication circuit, comprising:
   receiving a first location information request at a first reference time;
   transmitting first location information at a first reporting time having a first timing lapse from the first reference time in response to the first location information request;
   receiving a second location information request at a second reference time;
   calculating a timing difference between the first reporting time and a second reporting time, wherein the second reporting time has a second timing lapse from the second reference time;
   determining second location information according to the first location information when the timing difference is less than or equal to a predetermined timing difference threshold; and
   transmitting the second location information at the second reporting time in response to the second location information request,
   wherein the first timing lapse is a first multiple of a first timing period; and
   the second timing lapse is a second multiple of a second timing period.

2. The method as claimed in claim 1, wherein the determining the second location information step further comprises:
   determining the second location information according to the first location information and the timing difference when the timing difference is less than or equal to the predetermined timing difference threshold.

3. The method as claimed in claim 1, further comprising:
   taking the first reporting time as the second reporting time, when the timing difference exceeds the predetermined timing difference threshold.

4. The method as claimed in claim 1, further comprising:
   delaying the second reporting time by a delay time such that a delayed timing difference between the first reporting time and the delayed second reporting time is less than or equal to the predetermined timing difference threshold, when the timing difference exceeds the predetermined timing difference threshold.

5. The method as claimed in claim 1, wherein the determining the second location information comprises:
taking the first location information as the second location information when the timing difference is less than or equal to the predetermined timing difference threshold.

6. A method of reporting location information by a mobile communication circuit, comprising:
receiving a first location information request at a first reference time, wherein the first location information request comprises a first timing period;
transmitting first location information at a first reporting time having a first timing lapse from the first reference time in response to the first location information request;
receiving a second location information request at a second reference time, wherein the second location information request comprises a second timing period;
taking the first reporting time exceeding an initial second reporting time as a second reporting time, wherein the initial second reporting time having a second timing lapse from the second reference time, the second timing lapse is a second multiple of the second timing period; and
transmitting the first location information at the second reporting time in response to the second location information request,
wherein the first timing lapse is a first multiple of the first timing period.

7. The method as claimed in claim 6, further comprising:
calculating a successive second reporting time having a third timing lapse from the second reporting time; and
transmitting a second location information at the successive second reporting time,
wherein the third timing lapse is a third multiple of the second timing period.

8. The method as claimed in claim 6, wherein the taking the first reporting time as a second reporting time step comprises:
calculating a timing difference between the first reporting time and the initial second reporting time; and
taking the first reporting time later than the initial second reporting time as the second reporting time when the timing difference is less than a smaller one of the first timing period and the second timing period.

9. The method as claimed in claim 6, wherein:
the receiving the first location information request step comprises receiving the first location information request comprising a first SIM card number at the first reference time; and
the receiving the second location information request step comprises receiving the second location information request comprising a second SIM card number at the second reference time.

10. The method as claimed in claim 6, wherein:
the receiving the first location information request step comprises receiving the first location information request comprising a first application identification at the first reference time; and
the receiving the second location information request step comprises receiving the second location information request comprising a second application identification at the second reference time.

11. A mobile communication circuit, comprising:
a receiver, capable of receiving a first location information request comprising a first timing period at a first reference time, and receiving a second location information request comprising a second timing period at a second reference time;
a transmitter, capable of transmitting first location information at a first reporting time having a first timing lapse from the first reference time in response to the first location information request, and transmitting second location information at a second reporting time in response to the second location information request; and
a control circuit, coupled to the receiver and the transmitter, capable of calculating a timing difference between the first reporting time and the second reporting time, and determining second location information according to the first location information when the timing difference is less than or equal to a predetermined timing difference threshold;
wherein the first timing lapse is a first multiple of the first timing period;
the second reporting time has a second timing lapse from the second reference time, and the second timing lapse is a second multiple of the second timing period.

12. The mobile communication circuit as claimed in claim 11, wherein:
the control circuit is capable of determining the second location information according to the first location information and the timing difference when the timing difference is less than or equal to the predetermined timing difference threshold.

13. The mobile communication circuit as claimed in claim 11, wherein:
the control circuit is further capable of taking the first reporting time as the second reporting time, when the timing difference exceeds the predetermined timing difference threshold.

14. The mobile communication circuit as claimed in claim 11, wherein:
the control circuit is further capable of delaying the second reporting time by a delay time such that a delayed timing difference between the first reporting time and the delayed second reporting time is less than or equal to the predetermined timing difference threshold, when the timing difference exceeds the predetermined timing difference threshold.

15. The mobile communication circuit as claimed in claim 11, wherein the control circuit determining the second location information comprises:
taking the first location information as the second location information when the timing difference is less than or equal to the predetermined timing difference threshold.

16. A mobile communication circuit, comprising:
a receiver, capable of receiving a first location information request comprising a first timing period and a first reporting number of times at a first reference time, and receiving a second location information request comprising a second timing period and a second reporting number of times at a second reference time;
a transmitter, capable of transmitting first location information at a first reporting time having a first timing lapse from the first reference time in response to the first location information request, and transmitting the first location information at a second reporting time in response to the second location information request;
a control circuit, coupled to the receiver and the transmitter, capable of taking the first reporting time exceeding an initial second reporting time as the second reporting time,
wherein the first timing lapse is a first multiple of the first timing period; and the initial second reporting time having a second timing lapse from the second reference time, the second timing lapse is a second multiple of the second timing period.

17. The mobile communication circuit as claimed in claim 16, wherein:
the control circuit is further capable of calculating a successive second reporting time having a third timing lapse from the second reporting time; and
the transmitter is further capable of transmitting a second location information at the successive second reporting time;
wherein the third timing lapse is a third multiple of the second timing period.

18. The mobile communication circuit as claimed in claim 16, wherein the control circuit taking the first reporting time as the second reporting time comprises:
calculating a timing difference between the first reporting time and the initial second reporting time; and
taking the first reporting time later than the initial second reporting time as the second reporting time when the timing difference is less than a smaller one of the first timing period and the second timing period.

19. The mobile communication circuit as claimed in claim 16, wherein:
the receiver is capable of receiving the first location information request comprising a first SIM card number at the first reference time; and receiving the second location information request comprising a second SIM card number at the second reference time.

20. The mobile communication circuit as claimed in claim 16, wherein:
the receiver is capable of receiving the first location information request comprising a first application identification at the first reference time; and receiving the second location information request comprising a second application identification at the second reference time.

* * * * *